United States Patent [19]

Hayashi et al.

[11] Patent Number: 4,520,208
[45] Date of Patent: May 28, 1985

[54] AROMATIC POLYESTER CONTAINING PHENOLPHTHALEIN UNIT AND BIS-PHENOL UNIT

[75] Inventors: Masahiro Hayashi, Machidashi; Seiichi Nozawa, Yamato; Takashi Oikawa, Yokohama, all of Japan

[73] Assignee: Mitsubishi Chemical Industries Ltd., Tokyo, Japan

[21] Appl. No.: 505,494

[22] Filed: Jun. 17, 1983

[51] Int. Cl.³ ........................... C07D 307/78
[52] U.S. Cl. ..................................... 549/308
[58] Field of Search ............................ 549/308

[56] References Cited

U.S. PATENT DOCUMENTS 4,414,366  11/1983  Wu ........................ 525/439

Primary Examiner—Jane T. Fan
Attorney, Agent, or Firm—Oblon, Fisher, Spivak, McClelland & Maier

[57] ABSTRACT

An aromatic polyester comprising two structural units represented by the following formulas A and B in a molar ratio of the structural unit A to the structural unit B being from 70:30 to 90:10 or four structural units represented by the following formulas A, B, C and D in a molar ratio of the total of the structural units A and C to the total of the structural units B and D being from 10:90 to 95:5 and the total of the structural units C and D being less than 50 molar %, and having a reduced viscosity ηsp/C of from 0.6 to 4 dl/g as measured at 30° C. at a concentration of 1.0 g/dl in a solution of a mixture comprising phenol and tetrachloroethane in a weight ratio of 1:1, Structural unit A:

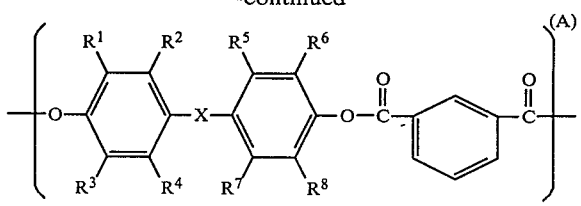

-continued

Structural unit B:

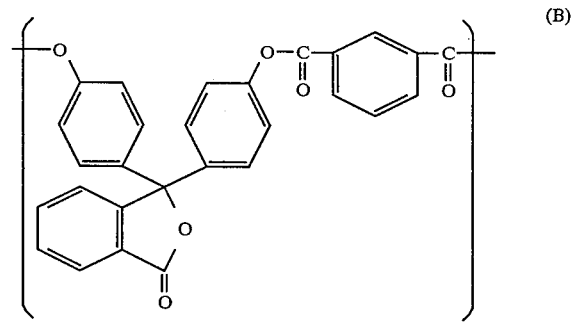

Structural unit C:

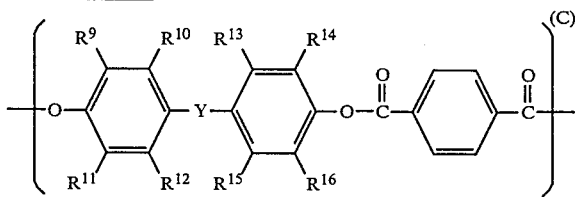

and

Structural unit D:

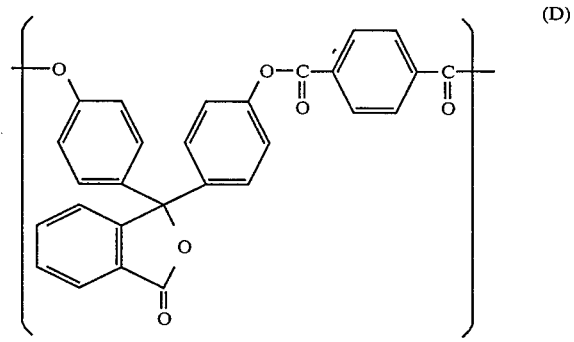

6 Claims, No Drawings

AROMATIC POLYESTER CONTAINING PHENOLPHTHALEIN UNIT AND BIS-PHENOL UNIT

The present invention relates to an aromatic polyester.

It has been well known for long to produce an aromatic polyester by interfacial polymerization by mixing an organic solvent solution of a mixture of terephthalic acid dichloride and isophthalic acid dichloride, with an aqueous alkaline solution of bisphenol A. However, the polymer thus obtained is not necessarily satisfactory in its heat resistance.

On the other hand, a polyether sulfone produced by reacting an alkali metal salt of bisphenol S (4,4'-dihydroxy diphenylsulfone) with 4,4'-dichloro diphenylsulfone, has excellent heat resistance, but the cost is high.

As a result of extensive researches to overcome the above difficulties, the present inventors have found an inexpensive aromatic polyester having high heat resistance and capable of being injection-molded. Further, this aromatic polyester is transparent and has excellent physical properties, and it is useful as an engineering plastic material.

Namely, the present invention provides an aromatic polyester comprising two structural units represented by the following formulas A and B in a molar ratio of the structural unit A to the structural unit B being from 70:30 to 90:10 or four structural units represented by the following formulas A, B, C and D in a molar ratio of the total of the structural units A and C to the total of the structural units B and D being from 10:90 to 95:5 and the total of the structural units C and D being less than 50 molar %, and having a reduced viscosity ηsp/C of from 0.6 to 4 dl/g as measured at 30° C. at a concentration of 1.0 g/dl in a solution of a mixture comprising phenol and tetrachloroethane in a weight ratio of 1:1, Structural unit A:

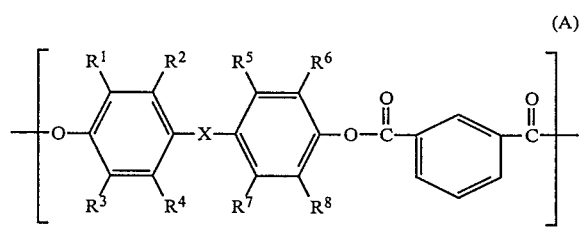

(A)

where X is an oxygen atom, a sulfur atom, a sulfonyl group, a carbonyl group, an alkylene group or an alkylidene group, and each of $R^1$, $R^2$, $R^3$, $R^4$, $R^5$, $R^6$, $R^7$ and $R^8$ is a hydrogen atom, a halogen atom or a hydrocarbon group, Structural unit B:

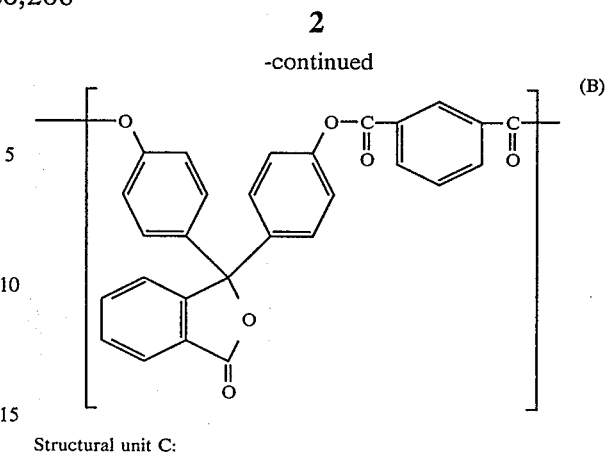

(B)

Structural unit C:

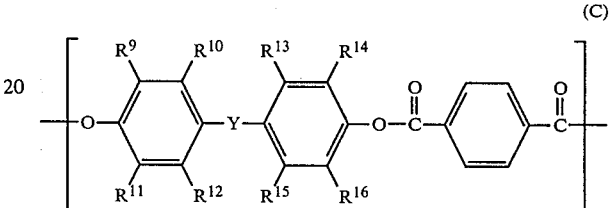

(C)

where Y is a oxygen atom, a sulfur atom, a sulfonyl group, a carbonyl group, an alkylene group or an alkylidene group, and each of $R^9$, $R^{10}$, $R^{11}$, $R^{12}$, $R^{13}$, $R^{14}$, $R^{15}$ and $R^{16}$ is a hydrogen atom, a halogen atom or a hydrocarbon group, and Structural unit D:

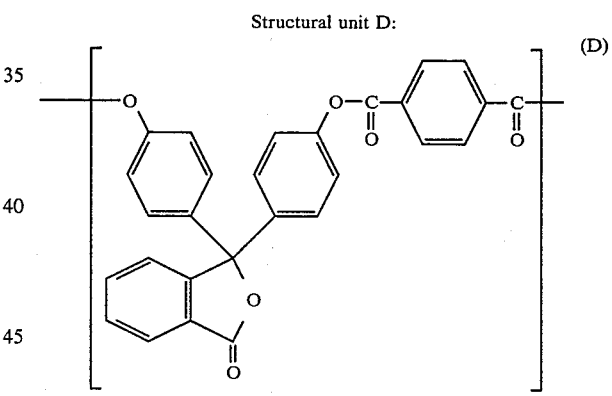

(D)

Now, the present invention will be described in detail with reference to preferred embodiments.

The aromatic polyester of the present invention comprises two structural units of the above formulas A and B or four structural units of the above formulas A, B, C and D. In the formulas A and C, each of X and Y is preferably an alkylene group or an alkylidene group, and particularly preferred is an aromatic polyester wherein each of X and Y is an isopropylidene group and each of $R^1$ to $R^{16}$ is an hydrogen atom. As another example, an aromatic polyester wherein the structural units of the formulas A and C are derived from a bisphenol, may be mentioned. When the aromatic polyester is composed of the two structural units, the molar ratio of the structural unit A to the structural unit B is preferably from 70:30 to 90:10. In the case where the aromatic polyester is composed of the four structural units, the molar ratio of the total of the structural units A and C to the total of the structural units B and D is usually from 10:90 to 95:5, preferably from 60:40 to 90:10, more preferably from 70:30 to 90:10. The total of the structural units C and D is usually less than 50 molar %, preferably less than 25 molar %.

If the amount of phenolphthalein is excessive, the cost will be high. On the other hand, if the amount is too small, the heat resistance will be inadequate.

Further, the aromatic polyester of the present invention has a reduced viscosity $\eta$ sp/C of from 0.6 to 4 dl/g, preferably from 0.65 to 1.1 dl/g, as measured at 30° C. at a concentration of 1.0 g/dl in a solution of a mixture comprising phenol and tetrachloroethane in a weight ratio of 1:1. If the above $\eta$ sp/C is less than 0.6 dl/g, the molded product tend to be brittle. On the other hand, if the $\eta$ sp/C exceeds 1.1, the melt-viscosity of the polymer tends to be high, whereby it becomes difficult to conduct injection molding.

As the method for producing such an aromatic polyester, an interfacial polycondensation method, a solution polycondensation method or a melt polycondensation method may generally be used. When the interfacial polycondensation method or the solution polycondensation method is used, a polymer having high degree of polymerization can readily be obtained. Whereas, when the melt polycondensation method is employed, solidification is likely to take place during the reaction unless the reaction temperature is brought to at least 300° C., and accordingly in order to obtain a polymer having high degree of polymerization, it is necessary either to bring the polymerization temperature to a level of at least 300° C. or to subsequently conduct solid phase polymerization. Further, in the case of the solution polymerization, it is necessary to use a solvent which is capable of dissolving the bisphenol, a mixture of phenolphthalein and an amine, an isophthalic acid dihalide, a terephthalic acid halide and the fomed polymer. Whereas in the case of the interfacial polycondensation, any solvent which is capable of dissolving the isophthalic acid dihalide and the polymer, can be used, and accordingly it is advantageous to use the interfacial polycondensation.

Thus, the aromatic polyester of the present invention can advantageously be produced by interfacial polycondensation from an organic solvent solution of isophthalic acid dichloride or a mixture thereof with terephthalic acid dichloride and an aqueous alkaline solution of a mixture comprising a bisphenol represented by the general formula

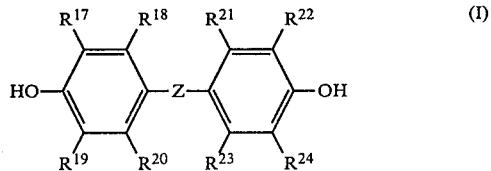

where Z is an oxygen atom, a sulfur atom, a sulfonyl group, a carbonyl group, an alkylene group or an alkylidene group, and each of $R^{17}$, $R^{18}$, $R^{19}$, $R^{20}$, $R^{21}$, $R^{22}$, $R^{23}$ and $R^{24}$ is a hydrogen atom or a hydrocarbon group, and phenolphthalein.

More specifically, as the organic solvent for terephthalic acid dichloride and isophthalic acid dichloride, there may be used a halogenated hydrocarbon such as methylene chloride, ethylene dichloride or chloroform, toluene or benzene. It should preferably be a solvent for the resulting polyester, and methylene chloride, 1,2-dichloroethane, 1,1,2-trichloroethane or 1,1,2,2-tetrachloroethane is preferably used. The acid chloride concentration in this solution may vary depending upon the reaction condition or the solubility in the organic solvent, but is usually from 2 to 30% by weight. Further, the acid chloride is likely to undergo hydrolysis in the presence of water, and accordingly it is desired that water in the organic solvent is minimum.

As the bisphenol to be used in the present invention, the compound represented by the above formula I is used, wherein Z is preferably an alkylene group or an alkylidene group. Specific examples of the bisphenol include 2,2-bis(4-hydroxyphenyl)propane, 2,2'-bis(4-hydroxy-3,5-dimethylphenyl)propane, 2,2'-bis(4-hydroxy-3,5-dichlorophenyl)-propane, 2,2-bis(4-hydroxy-3-methylphenyl)propane, 2,2-bis(4-hydroxy-3-chlorophenyl)-propane, bis(4-hydroxyphenyl)-methane, bis(4-hydroxy-3,5-dimethylphenyl)-methane, bis(4-hydroxy-3,5-dichlorophenyl)-methane, bis(4-hydroxy-3,5-dibromophenyl)-methane, B 1,1-bis(4-hydroxyphenyl)cyclohexane, 4,4'-dihydroxydiphenyl-bis(hydroxyphenyl)-ketone, bis(4-hydroxy-3,5-dimethylphenyl)-ketone, bis(4-hydroxy-3,5-dichlorophenyl)-ketone, bis(4-hydroxyphenyl)sulfide, bis(4-hydroxy-3-chlorophenyl)-sulfide, bis(4-hydroxy-3,5-dichlorophenyl)-sulfide, bis(4-hydroxyphenyl)-sulfone, and bis(4-hydroxy-3,5-dichlorophenyl)ether. These bisphenols may be used alone or in combination as a mixture. From the viewpoint of the cost, 2,2-bis(4-hydroxyphenyl)propane is most preferred. The bisphenol and phenolphthalein may be supplied for the reaction as a mixture or they may be supplied separately for the reaction. In any case, they are supplied for the reaction in the form of an aqueous alkaline solution. They are usually employed at a concentration of from 1 to 15% by weight in the aqueous alkaline solution. As the alkali, NaOH, KOH, LiOH, $K_2CO_3$, $Na_2CO_3$ or the like is added in an amount at least equal by molar ratio to the total amount of the bisphenol and phenolphthalein.

The interfacial polycondensation reaction takes place by the contact of the above-mentioned organic solvent solution of the acid chloride with the aqueous alkaline solution comprising the bisphenol and phenolphthalein. Such contact may be conducted by adding the aqueous alkaline solution comprising the bisphenol and phenolphthalein to the acid chloride solution or vice versa, or by supplying the two solutions simultaneously. Further, the reaction system may be a batch system or a continuous system. However, the two phases are incompatible with each other, and accordingly it is necessarily to disperse them as uniform as possible. In the case of the batch system, a homomixer or an agitation tank provided with a baffle is preferably used. In the case of the continuous system, it is preferred to use a pipe line mixer. The reaction is conducted at a reaction temperature of at most 50° C., preferably from 5° to 40° C., for a reaction time within a range of from 5 minutes to 8 hours.

For the polycondensation reaction, there may be used an interphase moving catalyst such as a quaternary ammonium salt or a quaternary phosphonium salt, an anti-oxidant such as hydrosulfite, and a molecular weight controlling agent such as a mono-functional phenol.

Subsequent to the polymerization reaction, the aqueous phase containing an alkali metal chloride is separated from the organic solvent phase in which the aromatic polyester copolymer is dissolved. This separation may be conducted by a stand-still separation or by a mechanical separation by means of e.g. a centrifugal separator. If necessary, it is possible to further wash the polymer layer with alkaline water, acidic water or neutral water. For the isolation of the polymer from the organic solvent solution, any conventional method for isolation may be used. If necessary, the polymer is further washed with an organic solvent such as methanol, ethanol, acetone, hexane or xylene.

The aromatic polyester copolymer obtained by the present invention has various advantageous. Namely, it has a low melt viscosity and can be injection-molded, and it has superior mechanical properties such as tensile strength, Izod impact strength, elongation at break bending strength, tensile modulus of elasticity or flexaral modulus as well as superior heat resistance, thermal decomposition initiation temperature, electric properties and dimensional stability. It has a low moisture or water absorptibility and is transparent.

Now, the present invention will be described in further detail with reference to Examples.

EXAMPLE 1

In a 1 l container equipped with a homomixer, an aqueous alkaline solution comprising 200 g of water, 2.52 g of sodium hydroxide and 0.066 g of sodium hydrosulfite, and 5.48 g of 2,2-bis(4-hydroxyphenyl) propane and 1.91 g of phenolphthalein were dissolved therein. Then, 0.15 g of trimethylbenzyl ammonium chloride was added. Separately, a solution containing 6.09 g of isophthalic acid dichloride dissolved in 150 g of methylene chloride was prepared. These solutions were preliminarily adjusted to 5° C., and the homomixer was then operated. While vigorously agitating the above-mentioned aqueous alkaline solution of a mixture comprising the bisphenol and phenolphthalein, the above-mentioned solution of isophthalic acid chloride was rapidly added.

The rotational speed of the homomixer was 6000 r.p.m. The agitation was further continued at 2° C. for 30 minutes. Then, the agitation was discontinued and the system was left to stand still, whereupon the methylene chloride phase and the aqueous phase were separated. The methylene chloride phase was added to 500 ml of ethanol, whereby a polymer was precipitated. The polymer thereby obtained was washed 3 times with 500 ml of boiling water, and then dried at 120° C.

This polymer had $\eta$ sp/C of 0.90 dl/g as measured at 30° C. at a concentration of 1.0 g/dl in a solution of a mixture comprising phenol and tetrachloroethane (1:1). (The same measuring method was employed in the following Examples.)

The NMR spectrum thereof showed an absorption (singlet) of a methyl proton of the bisphenol A residue at $\tau=8.08$, an absorption (quartet) of an aromatic proton of the bisphenol A residue at $\tau=2.70$ and an absorption (singlet) of an aromatic proton sandwiched between carbonyl groups of the isophthalic acid residue at $\tau=0.82$. Further, from the surface area intensity ratio of each signal, it was evident that the polymer formed substantially corresponded to the feed materials. The IR spectrum thereof showed an absorption of the benzene ring at 3030, 1603, 1580 and 1500 cm$^{-1}$, an absorption of carbonyl of the lactone ring of the phenolphthalein at 1780 cm$^{-1}$, an absorption of carbonyl of the isophthalic acid ester at 1740 cm$^{-1}$ and an absorption of a methyl group at 2960, 1470 and 1170 cm$^{-1}$.

This polymer was pressed at 280° C., whereby a transparent strong pressed piece was obtained. Further, by means of a parallel plate plastometer manufactured by Toyo Seiki, the test piece was heated under a load of 20 kg/cm$^2$ at a rate of 2° C./min., and the temperature (hereinafter referred to as HDT*) at which the test piece started to undergo abrupt deformation, was measured. The HDT* was 198° C. A similar test was conducted with respect to u-polymer (u-100), whereby the HDT* was 186° C.

Further, the results of the elemental analysis of the obtained polymer are as follows, and they agree to the calculated values based on the molar ratio.

|  | C | H |
| --- | --- | --- |
| Calculated values (%) | 76.49 | 4.88 |
| Measured values (%) | 76.40 | 4.95 |

From the foregoing, the polymer obtained here was found to comprise the above-mentioned structural unit A (wherein X is an isopropylidene group and each of $R^1$ to $R^8$ is a hydrogen atom) and the structural unit B in a molar ratio of 80:20.

EXAMPLE 2

In a 30 l container equipped with a homomixer, a reaction was conducted in the same manner as in Example 1 except that 10 l of water, 126 g of sodium hydroxide, 3.33 g of sodium hydrosulfide, 274 g of 2,2-bis(4-hydroxyphenyl)propane, 95.5 g of phenolphthalein, 7.5 g of trimethylbenzyl ammonium chloride 7.5 l of methylene chloride and 304.5 g of isophthalic acid dichloride were used. The polymer thereby obtained was precipitated in 25 l of ethanol, and then the polymer was washed 3 times with 25 l of boiling water and then dried. The $\eta$ sp/C of this polymer was 0.90 dl/g as in the case of Example 1.

This polymer was pressed at 280° C., whereby a transparent strong pressed piece was obtained.

The NMR spectrum of the above polymer showed an absorption (singlet) of a methyl proton of the bisphenol A residue at $\tau=8.08$, an absorption (quartet) of an aromatic proton of the bisphenol A residue at $\tau=2.70$ and an absorption (singlet) of an aromatic proton sandwiched between carbonyl groups of the isophthalic acid residue at $\tau=0.82$. Further, from the surface area intensity ratio of each signal, it was evident that the polymer formed substantially corresponded to the feed materials. The IR spectrum thereof showed an absorption of the benzene ring at 3030, 1603, 1580 and 1500 cm$^{-1}$, an absorption of carbonyl of the lactone ring of the phenolphthalein at 1780 cm$^{-1}$, an absorption of carbonyl of the isophthalic acid ester at 1740 cm$^{-1}$ and an absorption of a methyl group at 2960, 1470, 1380 and 1170 cm$^{-1}$. Further, the results of the elemental analysis of the obtained polymer are as shown below, and they agree to the calculated values based on the molar ratio.

|  | C | H |
| --- | --- | --- |
| Calculated values (%) | 76.49 | 4.88 |
| Measured values (%) | 76.41 | 4.90 |

From the foregoing, the polymer obtained here was found to comprise the above-mentioned structural unit A (wherein X is an isopropylidene group and each of $R^1$ to $R^8$ is a hydrogen atom) and the structural unit B in a molar ratio of 80:20.

Further, the above polymer was pelletized at 330° C. to obtain a polymer having $\eta$ sp/C=0.84 dl/g. The melt viscosity of the pellets was $1.1 \times 10^5$ poise as measured at 300° C. at 100 sec $^{-1}$ by means of "KOKA" type flow tester (Shimazu Seisakusyo Ltd.). (The same measuring method was used in the following Examples.)

This polymer was further subjected to injection molding by a 2.5 OZ injection molding machine manufactured by Toshiba Kikai K.K., and the physical properties of the molded product were measured. The results thereby obtained are shown in Table 1.

TABLE 1

|  | Example 2 |
| --- | --- |
| Tensile strength (yield) (kg/cm$^2$) (D-638) | 78.5 |
| Elongation at break (%) (D-638) | 80 |
| Flexural modulus (kg/cm$^2$) (D-790) | 19500 |
| Izod impact strength kg · cm/cm ($\frac{1}{8}$" notch) (D-256) | 22.5 |
| Heat distorsion temperature (°C.) (18.6 kg/cm$^2$, D-648) | 187 |
| Non-flammability test (UL-94$\frac{1}{8}$") | V-0 |

EXAMPLE 3

The reaction and after-treatment were conducted in the same manner as in Example 1 except that 5.14 g of 2,2-bis(4-hydroxyphenyl) propane and 2.39 g of phenolphthalein were used.

The polymer thus obtained had $\eta$ sp/C of 0.82 dl/g and HDT* of 206° C. The results of the elemental analysis of the obtained polymer are as shown below.

|  | C | H |
| --- | --- | --- |
| Calculated values | 76.48 | 4.60 |
| Measured values | 76.40 | 4.55 |

Further, the IR and NMR of the polymer were measured in the same manner as in Example 1, whereby it was found that the polymer comprised the above-mentioned structural unit A (wherein X is an isopropylidene group and each of R$^1$ to R$^{16}$ is a hydrogen atom) and the structural unit B in a molar ratio of 75:25.

EXAMPLE 4

The reaction and after-treatment were conducted in the same manner as in Example 1 except that 2.68 g of 2,2-bis(4-hydroxyphenyl)propane and 1.43 g of phenolphthalein were used.

The polymer thereby obtained had $\eta$ sp/C of 0.89 dl/g and HDT* of 193° C. The results of the elemental analysis of the obtained polymer are as shown below.

|  | C | H |
| --- | --- | --- |
| Calculated values (%) | 76.72 | 4.76 |
| Measured values (%) | 76.75 | 4.70 |

Further, the IR and NMR of the polymer were measured in the same manner as in Example 1, whereby it was found that the polymer comprised the above-mentioned structural unit A (wherein X is an isopropylidene group, and each of R$^1$ to R$^{16}$ is a hydrogen atom) and the structural unit B in a molar ratio of 85:15.

EXAMPLE 5

The polymerization was conducted in the same manner as in Example 1 except that 4.87 g of isophthalic acid chloride and 1.22 g of terephthalic acid chloride were used.

The polymer thereby obtained had $\eta$ sp/C of 0.90 dl/g and HDT* of 200° C. A press molded product thereof was transparent.

Further, the NMR spectrum thereof showed an absorption (singlet) of a methyl proton of the bisphenol A residue at $\tau=8.08$, an absorption (quartet) of an aromatic piston of the bisphenol A residue at $\tau=2.70$, an absorption (singlet) of an aromatic proton sandwiched by carbonyl groups of the isophthalic acid residue at $\tau=0.82$ and an absorption (singlet) of an aromatic proton of the terephthalic acid residue at $\tau=1.5$. Further, from the surface area intensity ratio of each signal, it was evident that the polymer formed substantially corresponded to the feed materials. The IR spectrum thereof showed an absorption of the benzene ring at 3030, 1603, 1580 and 1500 cm$^{-1}$, an absorption of carbonyl in the lactone ring of phenolphthalein at 1780 cm$^{-1}$, an absorption of carbonyl of the isophthalic acid ester and terephthalic acid ester at 1740 cm$^{-1}$ and an absorption of a methyl group at 2960, 1470, 1380 and 1170 cm$^{-1}$.

EXAMPLE 6

The reaction was conducted in the same manner as in Example 1 except that 5.85 g of isophthalic acid chloride and 0.24 g of terephthalic acid chloride were used. The polymer thereby obtained had $\eta$ sp/C of 1.0 dl/g and HDT* of 198° C. When it was press molded, a transparent molded product was obtained.

We claim:

1. An aromatic polyester comprising two structural units represented by the following formulas A and B in a molar ratio of the structural unit A to the structural unit B being from 70:30 to 90:10 or four structural units represented by the following formulas A, B, C and D in a molar ratio of the total of the structural units A and C to the total of the structural units B and D being from 10:90 to B 95:5 and the total of the structural units C and D being less than 50 molar %, and having a reduced viscosity $\eta$ sp/C of from 0.6 to 4 dl/g as measured at 30° C. at a concentration of 1.0 g/dl in a solution of a mixture comprising phenol and tetrachloroethane in a weight ratio of 1:1, Structural unit A:

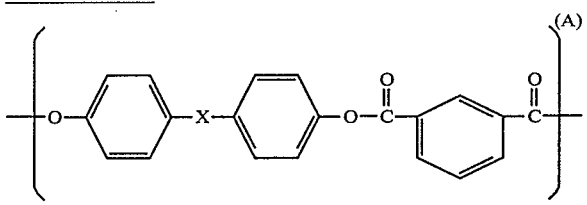

Structural unit B:

-continued

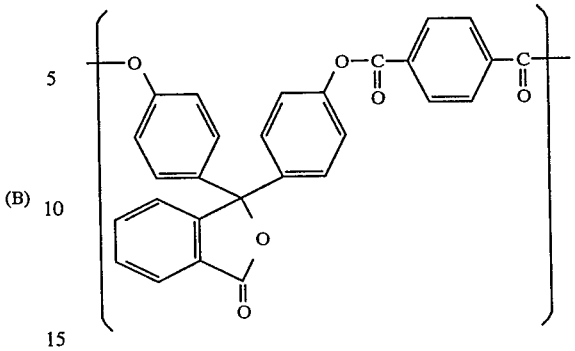
(D)

Structural unit C:

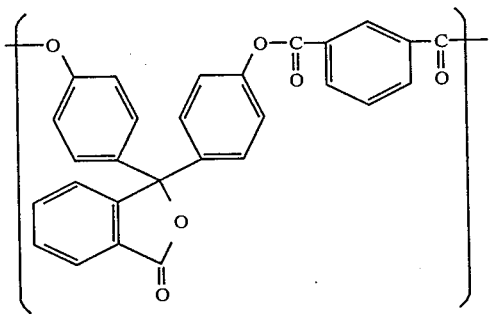
(C)

Structural unit D:

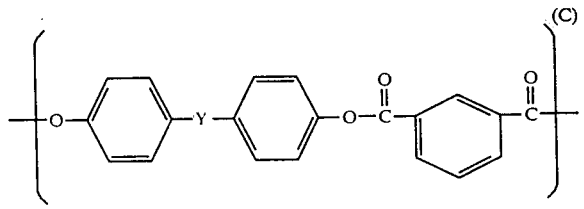

wherein the bisphenol component of structural units A and C is selected from the group consisting of 2,2-bis(4-hydroxyphenyl)propane, 2,2'-bis(4-hydroxy-3,5-dimethylphenyl)propane, 2,2'-bis(4-hydroxy-3,5-dichlorophenyl)propane, 2,2-bis(4-hydroxy-3-methylphenyl)-propane, 2-2-bis(4-hydroxy-3-chlorophenyl)-propane, bis(4-hydroxyphenyl)-methane, bis(4-hydroxy-3,5-dimethylphenyl)-methane, bis(4-hydroxy-3,5-dichlorophenyl)-methane, bis(4-hydroxy-3,5-dibromophenyl)-methane, 1,1-bis(4-hydroxyphenyl)cyclohexane, 4,4'-dihydroxydiphenyl-bis(hydroxyphenyl)-ketone, bis(4-hydroxy-3,5-dimethylphenyl)-ketone, bis(4-hydroxy-3,5-dichlorophenyl)-ketone, bis(4-hydroxyphenyl)sulfide, bis(4-hydroxy-3-chlorophenyl)-sulfide, bis(4-hydroxy-3,5-dichlorophenyl)-sulfide, bis(4-hydroxyphenyl)-sulfone, and bis(4-hydroxy-3,5-dichlorophenyl)ether.

2. The aromatic polyester according to claim 1 wherein the reduced viscosity $\eta sp/C$ is from 0.6 to 1.1 dl/g as measured at 30° C. at a concentration of 1.0 g/dl in a solution of a mixture comprising phenol and tetrachloroethane in a weight ratio of 1:1.

3. The aromatic polyester according to claim 1, wherein the molar ratio of the sum of structural units A and C to the sum of structural units B and D ranges from 60:40 to 90:10.

4. The aromatic polyester according to claim 3, wherein said molar ratio ranges from 70:30 to 90:10.

5. The aromatic polyester according to claim 1, wherein the total amount of structural units C and D in the polyester is less than 25 molar percent.

6. The aromatic polyester according to claim 1, wherein said reduced viscosity $\eta sp/C$ ranges from 0.65 to 1.1 dl/g.

* * * * *